(12) United States Patent
Park (10) Patent No.: US 9,946,949 B2
(45) Date of Patent: *Apr. 17, 2018

(54) TECHNIQUES INCLUDING URL RECOGNITION AND APPLICATIONS

(71) Applicant: Excalibur IP, LLC, Sunnyvale, CA (US)

(72) Inventor: Jin Suk Park, Seoul (KR)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,255

(22) Filed: Apr. 12, 2017

(65) Prior Publication Data

US 2017/0220889 A1 Aug. 3, 2017

Related U.S. Application Data

(63) Continuation of application No. 14/720,254, filed on May 22, 2015, now Pat. No. 9,652,680, which is a continuation of application No. 13/718,640, filed on Dec. 18, 2012, now Pat. No. 9,070,038, which is a continuation of application No. 13/017,464, filed on Jan. 31, 2011, now Pat. No. 8,358,843.

(51) Int. Cl.
| | |
|---|---|
| *G06K 9/66* | (2006.01) |
| *G06K 9/34* | (2006.01) |
| *G06K 9/32* | (2006.01) |
| *G06K 19/06* | (2006.01) |
| *G06K 7/14* | (2006.01) |
| *G06F 17/30* | (2006.01) |
| *G06Q 30/02* | (2012.01) |

(52) U.S. Cl.
CPC ....... *G06K 9/344* (2013.01); *G06F 17/30887* (2013.01); *G06K 7/1417* (2013.01); *G06K 9/3258* (2013.01); *G06K 19/06037* (2013.01); *G06Q 30/0256* (2013.01); *G06Q 30/0267* (2013.01); *G06Q 30/0277* (2013.01); *G06K 2209/01* (2013.01)

(58) Field of Classification Search
CPC ................. G06K 9/344; G06K 9/3258; G06K 19/06037; G06K 7/1417; G06K 2209/01; G06F 17/30887; G06Q 30/0267; G06Q 30/0277; G06Q 30/0256
See application file for complete search history.

(56) References Cited

U.S. PATENT DOCUMENTS

7,428,569 B1 * 9/2008 Fujihara ............. G01C 21/3623
382/321
7,593,961 B2 * 9/2009 Eguchi .............. G06F 17/30259
(Continued)

*Primary Examiner* — Amir Alavi
(74) *Attorney, Agent, or Firm* — Mauriel Kapouytian Woods LLP; Andrew A. Noble; James Woods (57) ABSTRACT

Methods are systems are provided that include obtaining a digital image from a digital photograph, such as may be taken by a digital camera or a camera phone. The digital image includes, for example, a URI or URL, which may be contained within a visible frame. A character recognition technique, such as an optical character recognition technique, may be used to recognize the URI or URL from the digital image. The URI or URL may be used to access a corresponding Web page. The character recognition technique may be applied on the digital camera or cell phone itself, or remotely.

20 Claims, 5 Drawing Sheets

(56) References Cited

U.S. PATENT DOCUMENTS

| | | | | |
|---|---|---|---|---|
| 7,797,331 | B2* | 9/2010 | Theimer | G06F 17/30038 |
| | | | | 707/769 |
| 7,903,875 | B2* | 3/2011 | Fujita | G06K 9/2054 |
| | | | | 382/175 |
| 8,045,808 | B2* | 10/2011 | Oliver | G06K 9/00463 |
| | | | | 382/203 |
| 8,169,651 | B2* | 5/2012 | Aoki | H04N 1/00209 |
| | | | | 358/1.11 |
| 8,358,843 | B2* | 1/2013 | Park | G06K 9/344 |
| | | | | 382/176 |
| 8,391,602 | B2* | 3/2013 | Chaki | G06K 9/34 |
| | | | | 382/173 |
| 8,494,273 | B2 | 7/2013 | Chevion et al. | |
| 9,070,038 | B2* | 6/2015 | Park | G06K 9/344 |
| 9,652,680 | B2* | 5/2017 | Park | G06K 9/2072 |
| 2001/0013012 | A1 | 8/2001 | Hanaoka et al. | |
| 2004/0247206 | A1 | 12/2004 | Kaneda et al. | |
| 2005/0050165 | A1 | 3/2005 | Hamynen | |
| 2012/0195505 | A1* | 8/2012 | Park | G06K 9/344 |
| | | | | 382/176 |
| 2013/0108158 | A1* | 5/2013 | Park | G06K 9/344 |
| | | | | 382/176 |
| 2017/0220889 | A1* | 8/2017 | Park | G06K 9/342 |

* cited by examiner

FIG. 5

TECHNIQUES INCLUDING URL RECOGNITION AND APPLICATIONS

PRIORITY INFORMATION

This application is a continuation of application Ser. No. 14/720,254, filed on May 22, 2015, now U.S. Pat. No. 9,652,680 entitled, "TECHNIQUES INCLUDING URL RECOGNITION AND APPLICATIONS", which is a continuation of application Ser. No. 13/718,640, now U.S. Pat. No. 9,070,038, filed on Dec. 18, 2012, entitled, "TECHNIQUES INCLUDING URL RECOGNITION AND APPLICATIONS", which is a continuation of application Ser. No. 13/017,464, now U.S. Pat. No. 8,358,843, filed on Jan. 31, 2011, entitled, "TECHNIQUES INCLUDING URL RECOGNITION AND APPLICATIONS", all of which are hereby incorporated herein by reference in its entirety.

BACKGROUND

Use of codes, such as codes that may be scanned or digitally photographed and may be used to access information or resources, including use of QR codes, among other techniques, have become increasingly possible and popular. For example, a cell phone or smart phone user may use the phone to obtain a digital image of a QR code. The QR code may be decoded to indicate a Web page, for example, that the user may then access. However, QR code usage, and other techniques, may be subject to various disadvantages.

SUMMARY

Some embodiments of the invention provide systems and methods that include obtaining a digital image from a digital photograph, such as may be taken by a digital camera or a camera phone. The digital image may include a URI, such as a URL, or other alphanumeric information, which may be contained within a visible frame. A character recognition technique, such as an optical character recognition technique, may be used to recognize the URI or URL from the digital image. The URI or URL may be used to access a corresponding Web page. The character recognition technique may be applied on or using the digital camera or cell phone itself, or remotely.

While the invention is described with reference to the above drawings, the drawings are intended to be illustrative, and the invention contemplates other embodiments within the spirit of the invention.

DETAILED DESCRIPTION

Figure 1:
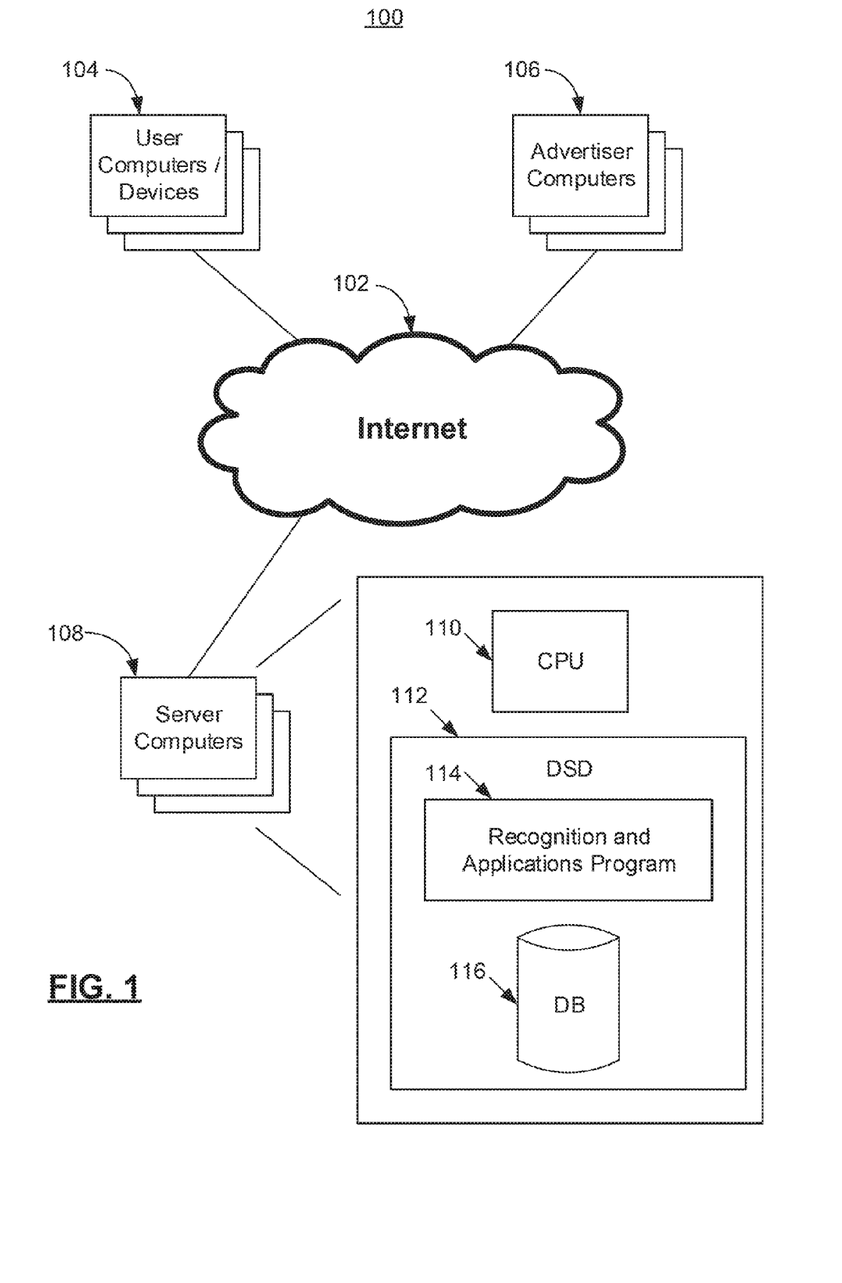
FIG. 1 is a distributed computer system according to one embodiment of the invention.

FIG. 1 is a distributed computer system 100 according to one embodiment of the invention. The system 100 includes user computers or other devices, including cell phones, etc. 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers (or other devices such as cell phones, smart phones, cameras, camera phones, etc.) 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Recognition and Applications Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
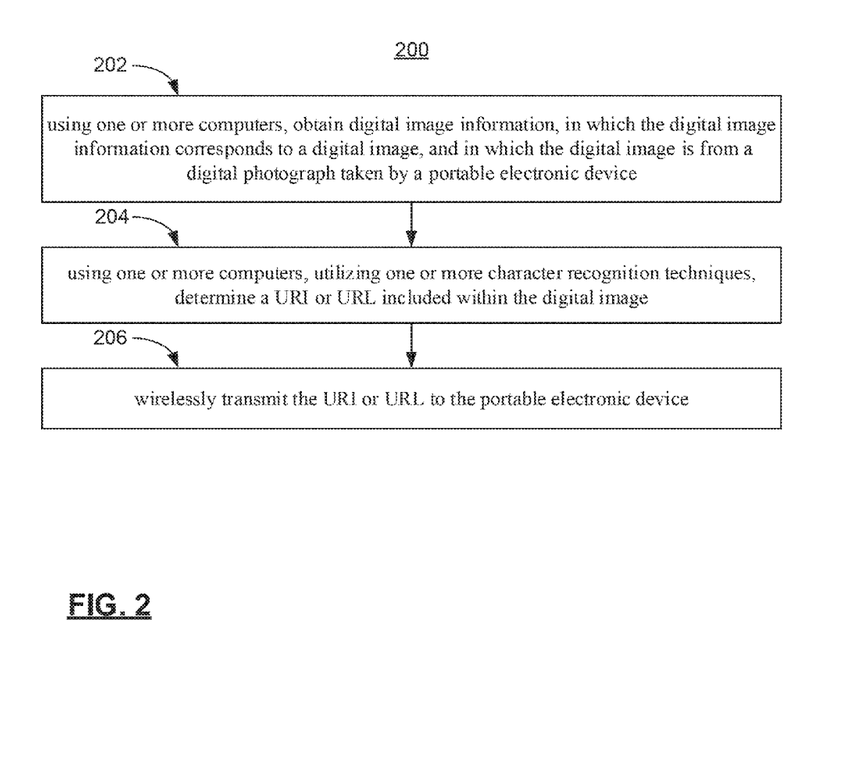
FIG. 2 is a flow diagram illustrating a method according to one embodiment of the invention.

FIG. 2 is a flow diagram illustrating a method 200 according to one embodiment of the invention. At step 202, using one or more computers, digital image information is obtained, in which the digital image information corresponds to a digital image, and in which the digital image is from a digital photograph taken by a portable electronic device.

At step 204, using one or more computers, utilizing one or more character recognition techniques, a URI or URL included within the digital image is determined. In other embodiments, an alphabetical, numerical, alphanumerical, or other symbol-based item or string may be determined, which may not be a URI or URL.

At step 206, the URI or URL is wirelessly transmitted to the portable electronic device.

Figure 3:
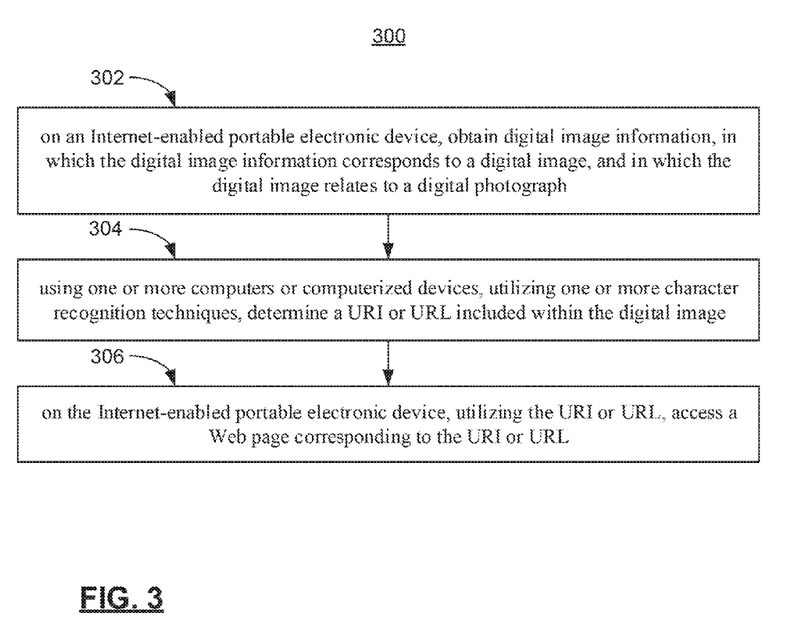
FIG. 3 is a flow diagram illustrating a method according to one embodiment of the invention.

FIG. 3 is a flow diagram illustrating a method 300 according to one embodiment of the invention. At step 302, on an Internet-enabled portable electronic device, digital image information is obtained, in which the digital image information corresponds to a digital image, and in which the digital image relates to a digital photograph.

At step 304, using one or more computers or computerized devices, utilizing one or more character recognition techniques, a URI or URL included within the digital image is determined.

At step 306, on the Internet-enabled portable electronic device, utilizing the URI or URL, a Web page corresponding to the URI or URL is accessed, such as by using a browser on the device.

Figure 4:
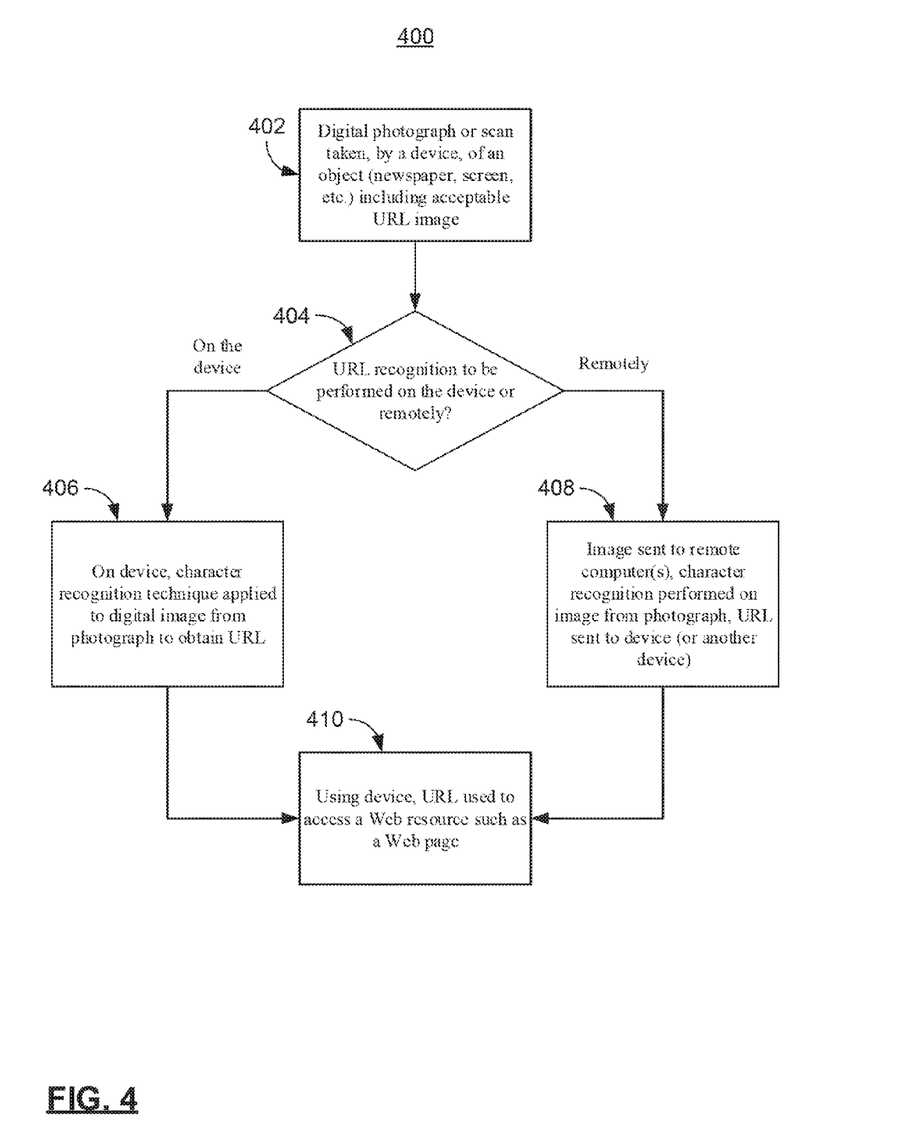
FIG. 4 is a flow diagram illustrating a method according to one embodiment of the invention.

FIG. 4 is a flow diagram 400 illustrating one embodiment of the invention. At step 402, a digital photograph or scan is taken, by a device, of an object (newspaper, screen, etc.) including acceptable URL image. In various embodiments, different qualities may be necessary for a URL image to be acceptable. In some embodiments, any URL that is satisfactorily recognizable to obtain a URI or URL is acceptable. For example, in some embodiments, the URL image must be of sufficient quality or resolution, or the angle must be sufficiently minimal, or the letters must be of a certain size or type, etc. Furthermore, in some embodiments, the URI or URL is contained within a visible frame, such as within lines forming a rectangle. The frame may appear on the object itself so as to be included on an image, or may be applied to the image after being taken or scanned, automatically or by a user, for example. Such a frame may enhance or optimize recognizability, which can include determining the location of the URL on an image, as well as interpreting letters, etc. In some embodiments, such a frame is necessary for acceptability, while in some embodiments it is not. Furthermore, in some embodiments, other visual cues or marks may be included, on an object or image, to aid in, enhance, or allow recognizability.

In some embodiments, an application is used on the photographing device, to implement or facilitate inventive methods. For example, in some embodiments, a cell phone application is opened, and the photograph is taken using the application. The application may then support character recognition, or sending for remote character recognition and receiving a URL. The application may then further be used in connecting to the Web page, storing the URL, etc. The application may also be used in various other ways, such as aiding in, enhancing, or optimizing recognizability of the image. For example, the application may alter, modify, or normalize the image, or any of various qualities or characteristics of the image, before character recognition is applied. This could include, for example, centering, changing or normalizing the angle at which the surface or URL portion appears, etc. It could also include taking away from the image, such as removing potentially confusing background or obscurities of the URL. It could further include adding to the image, such as by visibly boxing, circling, otherwise enclosing, or otherwise shading, marking or identifying the location of the URI or URL. Furthermore, in some embodiments, the user may take steps to enhance recognizability, such as by ensuring good photographing conditions or angle, etc. Still further, the user may alter, enhance or modify the image, such as by marking the image to identify the URL portion, prior to character recognition. An application may or may not be of use in these various regards. Furthermore, an application may provide cues to the user prior to taking the photograph, such as by alerting the user to poor or inadequate conditions for character recognition, such as distance, angle, URL size or clarity, etc.

Various sophisticated character recognition techniques may be utilized in embodiments of the invention, and may include machine learning techniques or models, for example.

At step 404, the method 400 queries whether URL recognition is to be performed on the device or remotely. If on the device, then the method 400 proceeds to step 406, where, on the device, one or more character recognition techniques are applied to the digital image from the photograph to obtain a URL. If remotely, then, at step 408, the image from the photograph is sent to one or more remote computers, character recognition is performed on the image (which can include or mean a portion of the image) to obtain a URL, and the URL is sent to the device (or another device or devices).

At step 410, using the device (or another device), the URL used to access a Web resource such as a Web page.

Figure 5:
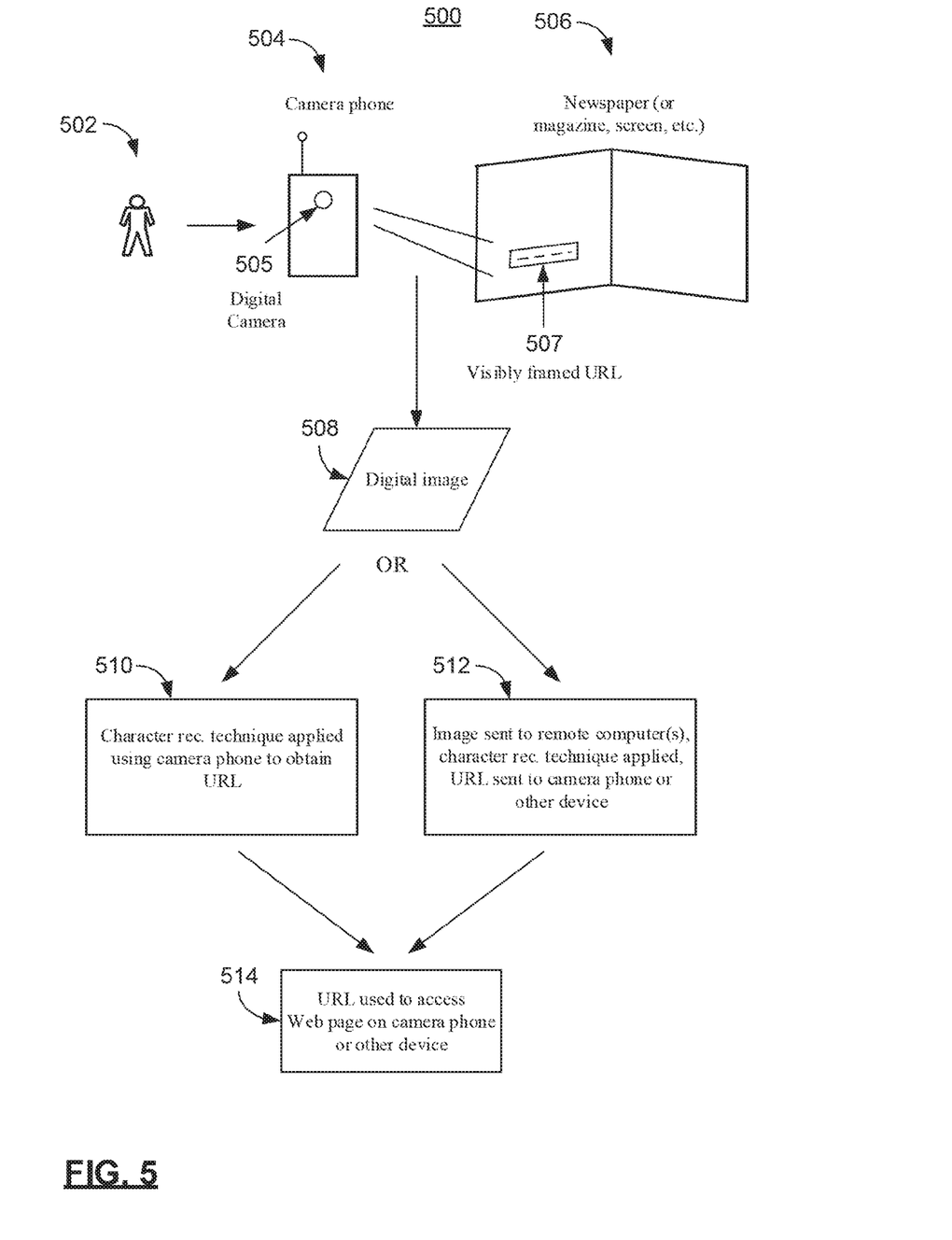
FIG. 5 is a block diagram illustrating one embodiment of the invention.

FIG. 5 is a block diagram 500 illustrating one embodiment of the invention. A user 502 is depicted, who uses a camera phone 504 (a cell phone with a camera) including a digital camera 505 to take a picture of, or to scan, a portion of a newspaper 506 (or another object or thing such as a magazine, display or computer screen, side of a bus, etc.) including a visibly framed URL 507 (although, in some embodiments, the URL is not framed) to produce a digital image 508.

Following this, two different possible courses are depicted, although others are also contemplated. One possible course is depicted by block 510, at which one or more character recognition techniques are applied using the camera phone to obtain a URL.

Another possible course id depicted by block 512. At block 512, the image is sent, such as by being wireless sent by the camera phone over the Internet or one or more other phone, wireless, or other networks, to one or more remote computers, one or more character recognition techniques are applied, such as using at least one of the computers, and a resulting URL is sent, such as wirelessly sent, to the camera phone (or another device).

At block 514, the URL is used to access the associated Web resource or Web page, such as using the camera phone.

Some embodiments of the invention include using a device such as a cell phone or camera phone to scan or take a picture of an object including a URI or URL. In addition to various objects such as newspapers, magazines, and various other indoor or outdoor objects, in some embodiments, a picture can taken of, for example, a computer monitor or other display screen (or even a non-physical image). For example, in some embodiments, a user can take a picture of a URL appearing on a computer screen, to be able to access the Web page from the user's cell phone or other device, immediately or later, without the potentially cumbersome task of typing in the Web page or sending it to the user's device by email or text, etc.

Character recognition can then be used on the cell phone itself, or remotely, to recognize the URI or URL from the image, so that it can be used to access a Web resource such as a Web page. As described above, various standards or techniques can be applied or utilized with the URI or URL (or other string, Web-related or otherwise, etc.) appearing on the object, to facilitate or ease character recognition, such as framing or otherwise marking a URI, URL, or string-containing portion, applying standards of clarity or other qualities to the URI or URL, etc. Furthermore, standards or requirements can be applied to the picture as well, such as being of sufficient clarity, or containing a sufficiently clear or large URI or URL, being taken at a specified range or maximum angle, etc.

If done remotely, powerful remote computers can be used to perform the character recognition. For example, in some embodiments, an Internet service provider providing Internet access for the cell phone may also provide the character recognition service or related services.

Some embodiments of the invention, for example, can provide a more convenient, simpler, more direct, or more user-friendly technique than QR code techniques. For example, acceptable URIs or URLs may be easier and simpler to generate than QR codes. Furthermore, QR code techniques may utilize various potentially difficult and annoying standards, software, applications, etc. while techniques according to some embodiments may be less complicated in this or other regards. Furthermore, directly displayed URLs or URLs are immediately understandable to the eye, whereas QR codes are not.

Although described primarily with regard to URLs and URLs, in some embodiments, the image could include characters, such as alphabetical, numerical or alphanumerical text, other than URLs or URIs. The characters from the image could be recognized, either on the photographing device or remotely, and used for various purposes.

Some embodiments of the invention provide various opportunities for advertisers and advertising. For example, the URL or URI could relate to a Web page containing one or more advertisements, or accessing the Web page could trigger or provide opportunities to serve advertisements. Alternatively, in some embodiments, advertising could be provided in connection with, or acceptance of advertising could be a condition of, utilizing a character recognition service or related services or actions. In some embodiments, the characters themselves could be or include an advertisement, coupon, offer, etc.

While the invention is described with reference to the above drawings, the drawings are intended to be illustrative, and the invention contemplates other embodiments within the spirit of the invention.

The invention claimed is:

1. A computerized method for recognizing network resource information, the method comprising:
    obtaining, from a portable electronic device, digital image information corresponding to a digital image, wherein the digital image includes one of a photograph, screen capture, scan or computer-generated image of an object;
    recognizing, by one or more computers using one or more character-recognition techniques, a uniform resource identifier (URI) or a uniform resource locator (URL) included within the digital image; and
    wirelessly transmitting, by one or more computers, the URI or URL to one or more other portable electronic devices.

2. The method of claim 1, wherein the one or more character-recognition techniques include a machine-learning technique.

3. The method of claim 1, wherein the one or more character-recognition techniques include at least one of altering, modifying, removing or normalizing at least one characteristic of the digital image.

4. The method of claim 3, wherein the one or more character-recognition techniques include at least one of centering, changing or normalizing a surface or portion of the image of the object included within the digital image.

5. The method of claim 1, wherein the one or more character-recognition techniques include at least one of recognizing an alphabetical, numerical, alphanumerical or symbol-based item or string, or a font size or type used within the URI or URL.

6. The method of claim 1, wherein recognizing the URI or URL within the digital image is conditioned upon an acceptance of one or more advertisements at one or more of the portable electronic devices.

7. The method of claim 1, wherein the one or more other portable electronic devices are configured to utilize an application to access a web resource associated with the URI or URL.

8. The method of claim 7, wherein accessing the web resource associated with the URI or URL facilitates serving one or more advertisements to one or more of the portable electronic devices.

9. The method of claim 1, wherein the digital image includes a visible frame, comprising at least one of a box, circle, shading or marking, indicating a location of the URI or URL within the digital image.

10. The method of claim 9, wherein the visible frame is included on a surface of an object captured by the digital image.

11. A system for recognizing network resource information, the system comprising:
    one or more processors;
    one or more data storage devices; and
    a resource recognition device executable on the one or more processors according to software instructions stored in the one or more data storage devices, the resource recognition device being configured to:
        obtain, from a portable electronic device, digital image information corresponding to a digital image, wherein the digital image includes one of a photograph, screen capture, scan or computer-generated image of an object;
        recognize, using one or more character-recognition techniques, a uniform resource identifier (URI) or a uniform resource locator (URL) included within the digital image; and
        wirelessly transmit the URI or URL to one or more other portable electronic devices.

12. The system of claim 11, wherein the one or more character-recognition techniques include a machine-learning technique.

13. The system of claim 11, wherein the one or more character-recognition techniques include at least one of altering, modifying, removing or normalizing at least one characteristic of the digital image.

14. The system of claim 13, wherein the one or more character-recognition techniques include one of centering, changing or normalizing a surface or portion of the image of the object included within the digital image.

15. The method of claim 11, wherein the one or more character-recognition techniques include at least one of recognizing an alphabetical, numerical, alphanumerical or symbol-based item or string, or a font size or type used within the URI or URL.

16. The system of claim 11, wherein the step of recognizing the URI or URL within the digital image is conditioned upon an acceptance of one or more advertisements at one or more of the portable electronic devices.

17. The system of claim 11, wherein the one or more other portable electronic devices are configured to utilize an application to access a web resource associated with the URI or URL.

18. The system of claim 17, wherein accessing the web resource corresponding to the URI or URL facilitates serving one or more advertisements to one or more of the portable electronic devices.

19. The system of claim 11, wherein the digital image includes a visible frame, comprising at least one of a box, circle, shading or marking, indicating a location of the URI or URL within the digital image.

20. A computer program product embedded in a non-transitory computer readable medium comprising instructions executable by a computer processor for recognizing network resource information, the instructions being executable by a computer processor to execute processing comprising:

obtaining, from a portable electronic device, digital image information corresponding to a digital image, wherein the digital image includes one of a photograph, screen capture, scan or computer-generated image of an object;

recognizing, using one or more character-recognition techniques, a uniform resource identifier (URI) or a uniform resource locator (URL) included within the digital image; and     wirelessly transmitting the URI or URL to one or more other portable electronic devices.

* * * * *